Aug. 30, 1932.                H. A. DOUGLAS                1,874,469
                               AEROPLANE
                           Filed Sept. 12, 1931
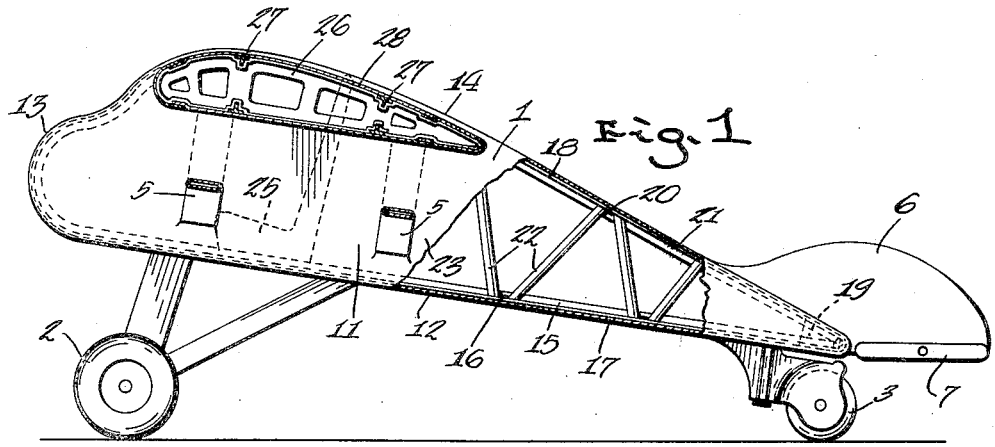
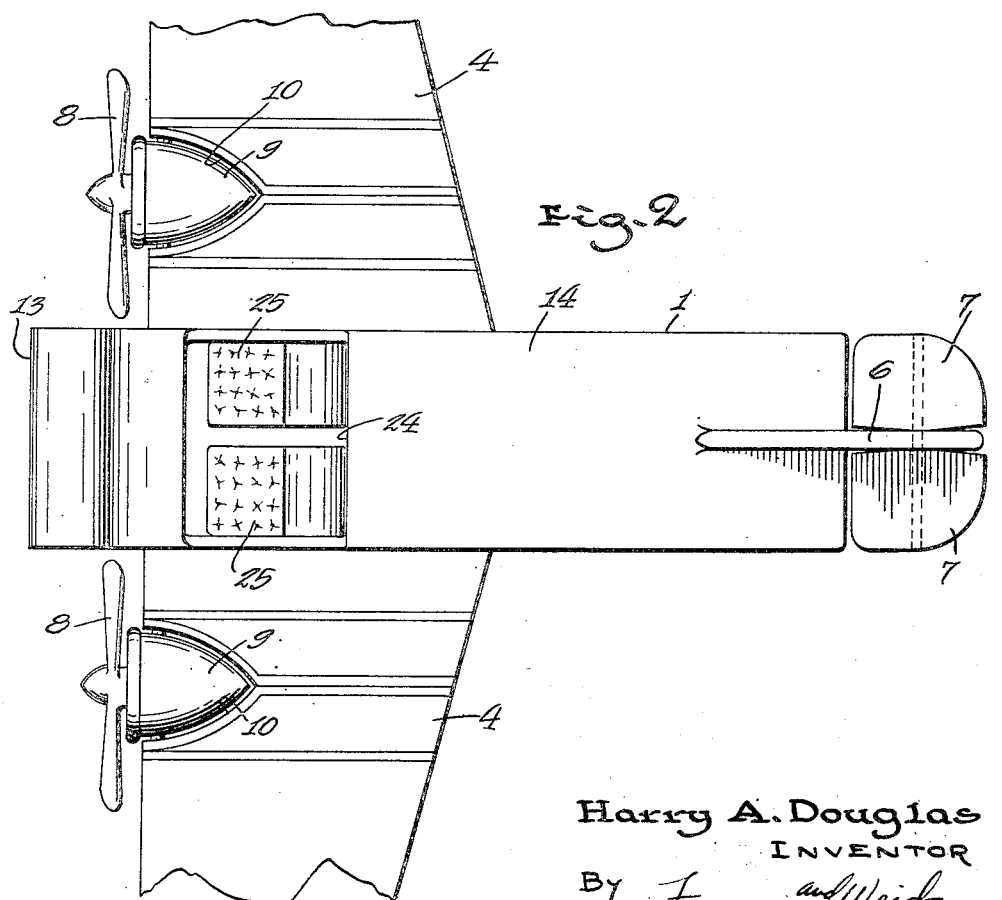
Harry A. Douglas
INVENTOR
BY Freeman and Weidman
ATTORNEYS Patented Aug. 30, 1932

1,874,469

UNITED STATES PATENT OFFICE

HARRY A. DOUGLAS, OF BRONSON, MICHIGAN

AEROPLANE

Application filed September 12, 1931. Serial No. 562,558.

My invention relates to aeroplanes, and particularly to aeroplanes of the monoplane type, and the principal object of my invention is to provide a new and improved aeroplane having a fuselage of a stream-line contour so that the fuselage itself will function as a wing in sustaining the aeroplane while in flight.

In the drawing accompanying this specification and forming a part of this application, I have shown for the purpose of illustration, one form which my invention may assume, and in this drawing:

Figure 1 is a view partly in vertical longitudinal section and partly in side elevation, with parts broken away, of an aeroplane constructed in accordance with my invention, while Figure 2 is a fragmentary plan view of the aeroplane illustrated in Figure 1.

Referring to the drawing, an aeroplane constructed according to my invention, is shown as comprising a fuselage 1, provided with a suitable landing gear 2, and a tail-skid in the form of a wheel 3. Secured to the opposite sides of the fuselage 1, and extending outwardly therefrom, is a pair of wings 4 which are supported by struts 5, extending upwardly and outwardly from the sides of the fuselage 1. The fuselage 1 is provided with the usual vertical stabilizer 6 and elevators 7 which are controlled from the cockpit of the aeroplane in any preferred manner. The aeroplane is steered laterally and also vertically by a pair of propellers 8 driven by independently tiltable engines 9 mounted in recesses 10 provided in the forward or leading edges of the wings 4. The specific mechanism for tilting the motors and propellers is covered in my copending application Serial Number 562,557.

The fuselage 1 comprises parallel side walls 11, a substantially planar lower wall 12, a substantially arcuate wall 13, and a curved upper wall 14, of stream-line contour, which slopes downwardly and rearwardly and merges with the lower wall 12 at the rear or trailing edge of the fuselage 1 and side walls 11. The lower wall 12 of the fuselage 1 comprises a plurality of longitudinally extending beams 15 connected by transversely extending angle bars 16, to which a suitable covering 17 such as corrugated duralumin is secured. The beams 15 and covering 17 extend forwardly and thence curve upwardly and rearwardly to form the front wall 13 of the fuselage 1. The upper wall 14 of the fuselage 1 comprises a pair of longitudinally extending beams 18 which are connected at their forward ends to the rearwardly curved ends of the beams 15 and which curve downwardly and rearwardly and are connected to the rear ends of the beams 15 by plates 19. The beams 18 are connected by a plurality of transversely extending angle bars 20 which together with the beams 18 support a suitable metallic covering 21 to form the upper wall 14 of the fuselage.

The side walls 11 of the fuselage 1 comprise a plurality of diagonally extending bracing members 22 of angular construction which are connected at their lower extremities with the beams 15 and at their upper ends with the beams 18, and which with the beams 18 support a suitable covering 23. The upper wall 14 of the fuselage 1 is partially cut away as indicated at 24 to provide access to the cockpit of the aeroplane which is provided with a plurality of pilots' seats 25.

The wings 4 of the aeroplane are also of stream-line configuration and are secured to the sides of the fuselage 1 adjacent to the upper portion thereof with the upper curved surface thereof arranged substantially in harmonic relation with the upper curved wall 14 of the fuselage and with the lower surface thereof substantially parallel to the lower wall 12 of the fuselage.

The construction of the wings 4 is the subject of my copending application Serial Number 562,557 and therefore need not be described in detail. Briefly, the wings 4 comprise a plurality of spaced transversely extending frame members 26 connected along their upper and lower edges by a plurality of longitudinally extending beams 27 of T-shape in cross-section and covered by a suitable metallic envelope 28.

From the foregoing it will be apparent that the upper stream-line surface of the fuselage 1 cooperates with the upper surfaces of the wings 4 in reducing air resistance and that the lower planar wall of the fuselage 1 cooperates with the lower surfaces of the wings 4 to provide an additional planing surface which aids in sustaining the aeroplane while in flight.

While I have herein disclosed the preferred embodiment of my invention it will be understood that various changes may be made and details modified, all without departing from the spirit of my invention, or sacrificing the advantages thereof, either those advantages hereinabove specifically pointed out or any other advantages not specifically pointed out but which nevertheless will be apparent to those skilled in the art. Therefore it will be understood that the disclosure herein is illustrative only, and that my invention is not limited thereto.

I claim:

An aeroplane, comprising: a fuselage having an upper wall of stream-line configuration, straight parallel side walls, a planar lower wall and a curved front wall; and wings secured to said side walls, said wings having curved upper surfaces coinciding throughout substantially their entire width with the upper wall of said fuselage, and planar lower surfaces spaced from and disposed in a plane parallel to the planar lower wall of said fuselage.

In testimony whereof I hereunto affix my signature.

HARRY A. DOUGLAS.